United States Patent [19]

Spreter et al.

[11] Patent Number: 5,051,220

[45] Date of Patent: Sep. 24, 1991

[54] METHOD FOR THE MANUFACTURE OF A HEATING ELEMENT

[76] Inventors: Victor Spreter, 25, chemin de Ruite, 1252 Meinier, Switzerland; Conrad Zellweger, 5, chemin des Voirons, 1224 Chene-Bougeries, Switzerland

[21] Appl. No.: 94,678

[22] PCT Filed: Nov. 27, 1986

[86] PCT No.: PCT/CH86/00165

§ 371 Date: Sep. 21, 1987

§ 102(e) Date: Sep. 21, 1987

[87] PCT Pub. No.: WO87/03530

PCT Pub. Date: Jun. 18, 1987

[30] Foreign Application Priority Data

Dec. 6, 1985 [CH] Switzerland .................. 05224/85

[51] Int. Cl.⁵ ............................................. B29C 43/20
[52] U.S. Cl. ................................. 264/113; 126/261; 126/262; 264/112; 264/120; 264/334; 264/DIG. 57
[58] Field of Search ............... 264/112, 113, 125, 120, 264/334, 336, DIG. 57, 3.1, 3.4; 126/262, 261

[56] References Cited

U.S. PATENT DOCUMENTS

| 461,890 | 10/1891 | Richardson | 264/DIG. 57 |
| 1,345,377 | 7/1920 | Linbarger | 264/112 |
| 1,792,844 | 2/1931 | Knecht | |
| 3,034,393 | 5/1962 | Lieberman et al. | 264/334 |
| 3,255,278 | 6/1966 | Smith | 264/113 |

OTHER PUBLICATIONS

WO83/00425, Feb. 1983.

Primary Examiner—Mary Lynn Theisen
Attorney, Agent, or Firm—Young & Thompson

[57] ABSTRACT

In order to form a heating element, a coil-shaped hollow path, cut into a plate (10), is filled with an exothermally reacting pulverulent mixture and is compressed by means of a correspondingly shaped pusher (13), a platen being then applied to the upper face of the plate (10). Thereafter, the coil (2) comprised of compressed reactive mixture is lifted above the plate (10) and covered with a refractory powder to which a binder has been added and the assembly is then compressed by means of a piston (36; FIG. 6). The assembly is then placed into a metal container (5) intended to diffuse the heat for heating for example foodstuffs, after the reactive mixture has been ignited through the opening (22).

6 Claims, 2 Drawing Sheets

METHOD FOR THE MANUFACTURE OF A HEATING ELEMENT

Heating elements are known in the form of a flat cake or lozenge comprising a layer of thermally insulating refractory material, a reactive layer constituted by means of a finely divided metal or metalloid, mixed with at least one oxidant, which is likewise finely divided, and a heat conducting and diffusing layer, the refractory layer comprising perpendicular walls creating a reaction path for the reactive layer. Elements of this type are described for example in European Patent No. 0084532.

These elements may be obtained by successive casting steps. The insulating layer may for example be constituted by plaster reinforced with a fibrous material such as glass fibre. The glass fibre/plaster mixture is in admixture with water and the liquid mass thus obtained is poured into an appropriate mould, such as to obtain a flat cake having a deep channel on one of its faces, formed by ribs shaped perpendicular to the plane of the cake, said channel forming a predetermined path. After solidification of the plaster, the cake is removed from the mold and the reactive exothermic mixture, provided in a fluid state by the addition thereto of a liquid which can contain a binder, is poured into the channel. This liquid may for example be water in admixture with a small percentage of silicate. A part of the liquid is progressively absorbed by the plaster and the reactive mass densifies. As soon as the reactive mass has attained an adequate consistency, the diffusing and conducting layer is placed on its surface, which layer may be either a film of metal, such as of aluminium or a pulverulent layer consisting of a metallic powder or other heat conducting element with the addition of an incombustible binder, such as silicate. Subsequently the assembly thus formed is heated in order to evaporate off the liquid elements which it contains. If this process is relatively easy to put into effect, it nevertheless has a certain number of disadvantages which render the manufacture of the elements slow and costly. The solidification of the plaster necessitates a minimum time of 15 minutes, and likewise the densification of the reactive layer takes an appreciable time. It is know that to facilitate its pouring, plaster should have an equal weight of water added to it and evaporation of this water necessitates use of a large quantity of energy.

The object of the present invention is to permit the rapid manufacture of the heating element in question in great numbers. This invention lends itself to the constitution of an entirely automated chain of manufacture, permitting the production of these elements in a very simple manner at a very low price.

To this end the present invention provides a process of manufacturing a heating element in the form of a flat cake comprising a support of generally flattened form and of thermally insulating refractory material, this support having walls substantially perpendicular to its length, these walls defining a hollow path therebetween in which is disposed an exothermic, finely divided, reactive mixture, said process being characterised in that a layer of the reactive mixture is deposited on a temporary support and provided with the mirror image of the said hollow path and a layer of a liquid or pulverulent refractory material is deposited on the reactive mixture layer thus formed, this layer of refractory material being subsequently subjected to a treatment effecting its hardening.

The accompanying drawings show schematically two examples of the process according to the present invention, and in which.

Figure 1:
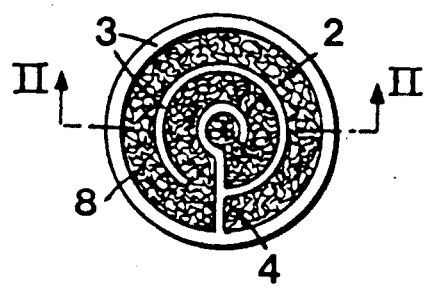
FIG. 1 is a section through a first flat cake along its principal plane.
Figure 2:
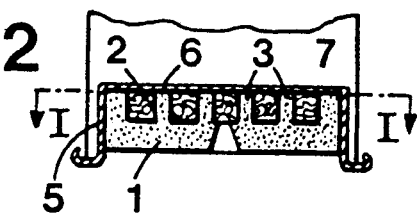
FIG. 2 is a section along the line II—II of FIG. 1.

FIGS. 1 and 2 show a heating element in section. This heating element is constituted by a layer of refractory material 1 having perpendicular walls 3 forming a reaction route 8 in which is disposed an exothermic reactive mixture 2, this route starting from the centre and following a curved path to terminate at 4 at the end of the path. This assembly is fixed to a small metallic cup 5, the face 6 of which constitutes a layer which diffuses the heat produced by the reactive mass 2. The metallic cup 5 may be obtained by pressing for example and it may be fastened by rolling to the wall 7 of a container which contains the product to be heated. This assembly is obtained by the process described below.

Figure 3:
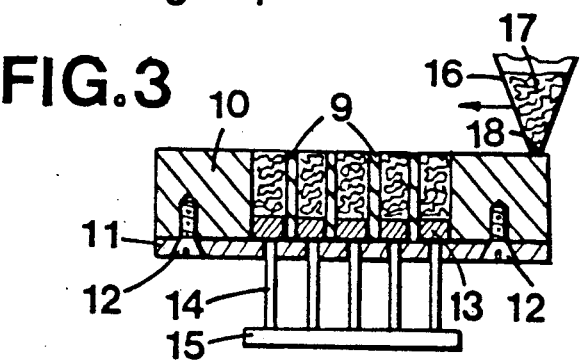
FIG. 3-7 show successive stages of the process of manufacture of the heating element according to FIGS. 1 and 2.

A moulding tool is used of the type which is currently employed in the sintered metal industry. It consists of a plate 10 (FIG. 3) of resistant material, for example of steel. In this plate, a path 8 such as shown in FIG. 1 is cut out for example by a wire electro erosion machine. A base plate 11 held by screws 12 supports the walls 9 left after cutting. A pressing element 13, having the shape of the hollow path 8 is fitted into the plate 10. This element 13 may be moved in the direction perpendicular to the plate 10 by the intermediary of rods 14 passing into openings provided in the base plate 11, these rods being fixed to a disc 15. As shown in FIG. 3, a funnel 16 filled with pulverulent reactive mixture 17, sealed at its base 18 by the plate 10 is displaced parallel to the upper face of this plate 10 in a manner such as to pass above the cut-out part and to fill the cavity formed with the pulverulent mixture 17 which escapes from the base of the funnel 16.

When the moulding tool is filled with pulverulent reactive mixture a plate 20 is placed on plate 10 (see FIG. 4) and held against the plate 10 by clamping means such as a jack 21. Subsequently a compression force, symbolised by the arrow is applied to the disc 15 to compress the contents of the mould against the plate 20 by the intermediary of the rods 14 and pressing elements 13.

Figure 4:
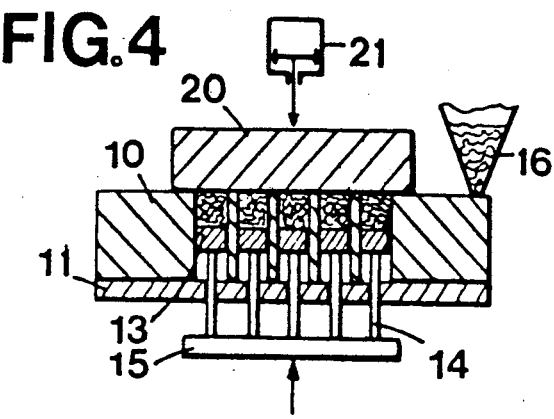

FIG. 4 shows the position of the different elements at the end of compression. As soon as the pression force is attained, the jack 21 is released, the plate 20 raised, then the disc 15 displaced to eject the reactive element thus obtained from the moulding tool. The ejection device stops when the base of the object is at the level of the upper face of the plate 10.

The pulverulent reactive mixture is in admixture with an adequate quantity of an agglomerant agent, such as a small percentage of binding liquid or a colloid, such as a powdered clay etc. It is well known in pyrotechnics that if at the time of compression, one exceeds a certain load per unit area, the reactive mixture may become inactive. Compression loads generally used for sintering metals cannot therefore be used and, for this reason, a moulded element is obtained which is relatively fragile and, in view of its configuration, practically impossible to handle.

Figure 5:
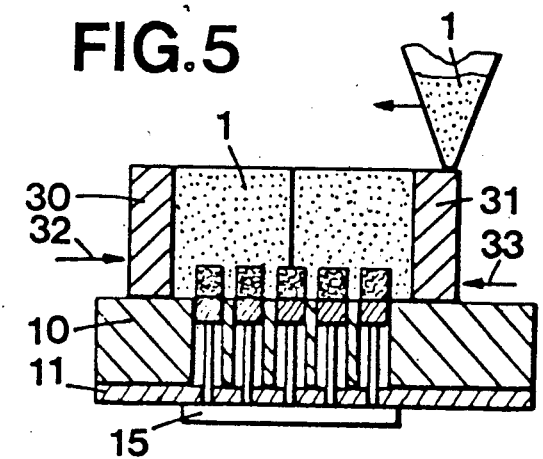
Figure 6:
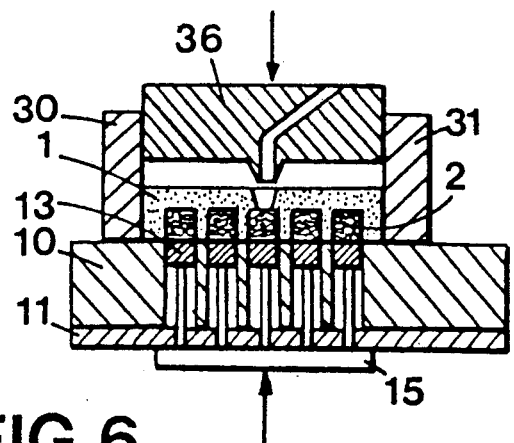
Figure 7:
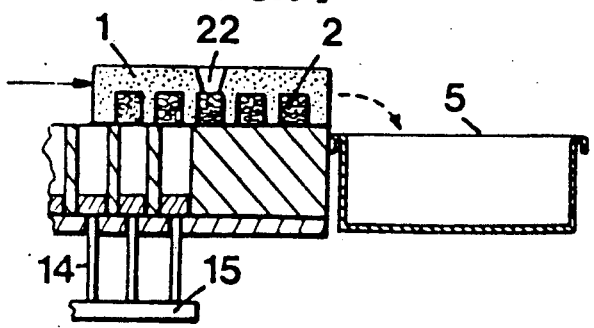

In the subsequent operation, the disc 15 is held in its last position. The reactive element thus formed has the refractory material 1 moulded onto it on the spot. To this end, a mould composed of two half shells 30 and 31 held together by clamping means symbolised by the arrows 32 and 33 (FIG. 5) is placed on the plate 10. This mould completely encircles the reactive mass. The mould is then filled with a pulverulent insulating material in admixture with a binder. This material is then compressed by a piston 36 (FIG. 6) thus completely covering the reactive mass, with the exception of the face of the latter which is in contact with the ejector. After having withdrawn the piston 36 (FIG. 7) the two half shells 30 and 31 forming the mould are separated. The compression piston is provided with a punch detaching a plug from the insulating mass, and thus creating an access 22 to the reactive mass permitting activation of the latter.

The object thus formed is sufficiently solid to be manipulated delicately. It may be transferred into the cup 5 (FIG. 7) and the assembly thus formed is placed in a press which, with the aid of an adequate piston, once again compresses the assembly of the reactive and insulating masses in a manner to effect perfect marriage to the shape of the cup.

Figure 8:
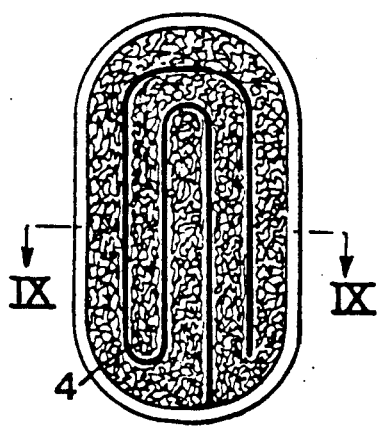
FIG. 8 is a section through another flat cake along its principal plane.
Figure 9:
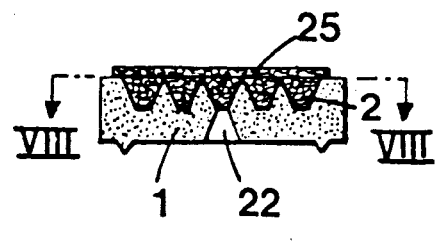
FIG. 9 is a section along the lines IX—IX of FIG. 8.

FIGS. 8 and 9 represent a heating element of the same type as that of FIGS. 1 and 2 but in which the metallic cup 5 is replaced by a heat diffusing layer constituted by a layer 25 forming part of the heating element and formed by an agglomerated pulverulent mixture.

Figure 10:
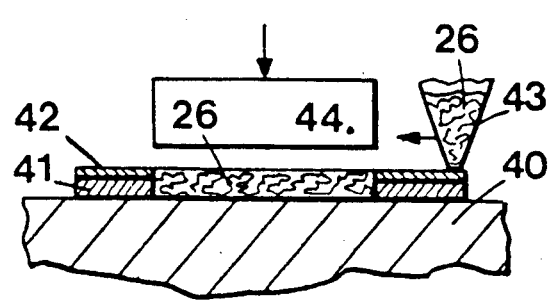
FIGS. 10-13 show successive stages of the process of the manufacture of the heating element according to FIGS. 8 and 9.
Figure 11:
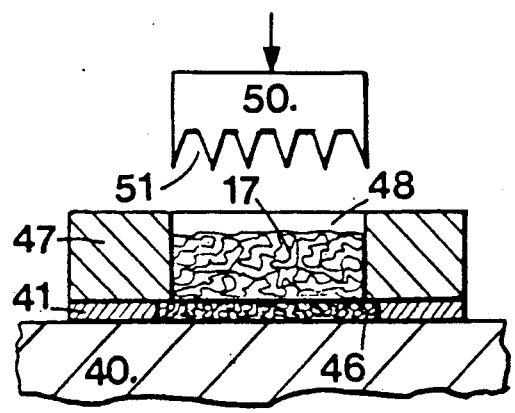

The heating element is produced as follows. A template consisting of a plate 41 having the desired thickness of the heat dispersion layer is placed on a base 40 as shown in FIG. 10, the plate having an opening with the contour of the said layer. A second template 42 of a similar shape is placed on the first. The space thus formed by the two superposed templates is filled with a pulverulent mixture 26 consisting of a mass of good heat conductivity, such as for example, a metallic powder, silicon carbide, etc, admixed with an appropriate inorganic binder, such as a silicate. This mass, which has the approximate consistency of moist sand, may be deposited, with the aid of a funnel 43, onto the bed formed by the stencil-plates 41 and 42. This mass is then compressed with the aid of a piston 44. During compression, this mass diminishes substantially in volume and the thickness of the stencil-plate 42 is chosen in such a manner that, after compression, the conductive mass will have the same thickness as the stencil-plate 41. Once compression is effected the piston 44 is withdrawn as well as the stencil-plate 42. The heat conducting layer thus formed may be displaced by sliding the stencil-plate 41, with its contents, on the base 40. Subsequently a mould in the form of frame 47 is placed on the stencil-plate 41, containing the heat diffusing layer 46, the frame having an opening 48 in which there is deposited a layer of substantially equal thickness of reactive mixture 17 in the form of a pulverulent mixture, in admixture with an agglomerant or a binder. This mixture is subsequently compressed with the aid of piston 50 having an engraving 51 on its face, which comes into contact with the reactive mixture, the contour of which engraving is such as that of the reactive layer to be formed.

Figure 12:
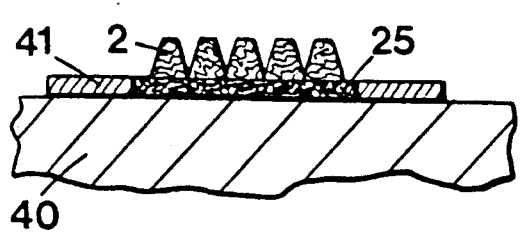
Figure 13:
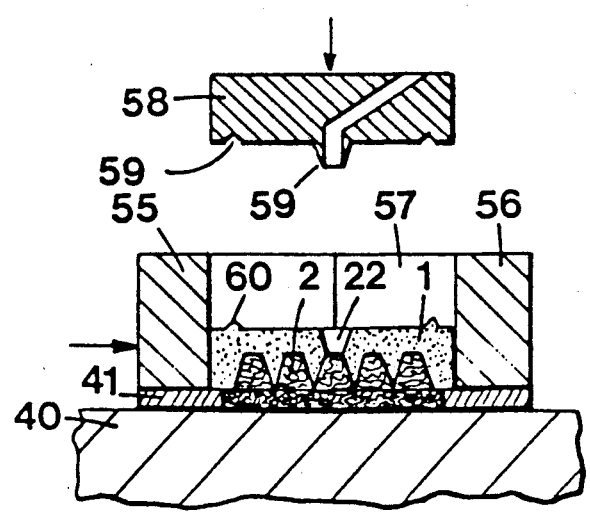

After this compression, the piston 50 is withdrawn and the mould 47 raised to obtain the assembly shown in FIG. 12, that is to say, the diffusing layer 25 still framed by the stencil-plate 41, on which is disposed a serpentine of reactive mixture 2.

It is of advantage to give a clearance to the engraving 51 on piston 50 sufficient to enable the compressed mass to unmould itself by gravity. If it proves necessary, one can provide the stamp created in the piston 50 with an ejection device for example similar to that described in the first embodiment.

The assembly represented in FIG. 12 may then be transferred by sliding onto a table 40 and then two elements 55 and 56 are placed on the stencil-plate 41 to form an enclosure 57 having a section with the circumference of the final heating element. This enclosure 57 is filled with a pulverulent mixture consisting of a granulated, insulating, refractory material, in admixture with an inorganic binder, for example a silicate. This material is compressed with the aid of a piston 58, the active face of which is formed to imprint a supporting ridge 60 in the refractory material, and a slot 22 the base of which is constituted by the reactive mixture. This slot is for enabling the firing of the reactive mixture.

After having withdrawn the piston 58 the assembly thus formed can be released by separating one or the other of the elements 55 and 56 forming the enclosure. The assembly obained is sufficiently solid to be able to be manipulated with caution, to be placed on a support permitting its transportation into an oven for the necessary solidification treatment of the binders and the release of the solvents used in the binders.

An expanded mineral commercially known under the name of "Perlite" is particularly advantageous for the insulating layer. It permits the production of a very light insulating layer, with great insulating power, and the spheroidal form of the grains permits free filling of the element which is to be moulded onto. The insulating layer could also be made of plaster which would subsequently be allowed to rest until hardened.

Different binders may be used to constitute the different layers and good results have been obtained notably with silicate of soda, silicate of potassium, phosphoric acid and its salts or esters of silicic acid.

We claim:

1. In a method for the production of a heating element which includes a reactive material capable of exothermic reaction, said heating element including a support comprised of an insulating layer of refractory material from which wall portions extend in a perpendicular direction which define a reaction path therebetween and in which reaction path is disposed said reactive material, said method comprising molding said reactive material in the shape of said reaction path and applying said insulating layer thereto, the improvement comprising contacting a layer of said reactive material with a mold member which includes a mold surface defining a mirror image of the desired reaction path, pressing said mold surface against said reactive material to form a molded surface thereon, removing said molded reactive material from contact with said mold surface of said mold member, forming a layer of said refractory material in encompassing relationship to said molded surface of said reactive material, said mold surface of said mold member which comprises said mirror image being defined by a hollowed-out portion of a mold, said mold including compression means within said hollowed-out portion adapted to compress said reactive material within said hollowed-out portion, subsequently removing said reactive material from said hollowed-out portion by displacement of said compression means and supporting said reactive material thereon subsequent to being removed from said hollowed-out portion, and forming said layer of refractory material on said removed reactive material while supporting said reactive material upon said compression means.

2. The method of claim 1 comprising providing an opening in said refractory material to permit access to said refractory material during formation of said layer of refractory material.

3. In a method for the production of a heating element which includes a reactive material capable of exothermic reaction, said heating element including a support comprised of an insulating layer of refractory material from which wall portions extend in a perpendicular direction which define a reaction path therebetween and in which reaction path is disposed said reactive material, said method comprising molding said reactive material in the shape of said reaction path and applying said insulating layer thereto, the improvement comprising using a mold made of at least two parts, one of which is provided with wall portions corresponding to the wall portions to be formed in said insulating layer, placing a powdery reactive material into said mold, displacing one part of said mold relative to said other part in order to compress said powdery reactive material and form the desired shape of said reaction path, removing said molded reactive material from contact with said mold part provided with said wall portions, forming a layer of said refractory material in encompassing relationship to said molded surface of said reactive material, after removing said molded refractive material from contact with said part, surrounding said molded reactive material with another mold part and placing a pulverulent refractory material over said reactive material within said other mold part, and compressing said pulverulent refractory material within said surrounding other mold part, and providing access to a portion of said reactive material through said refractory material during said compression step by means of a die member which includes a projection on a molding surface thereof adapted to extend through said refractory material.

4. The method of claim 3, wherein a layer of heat diffusing material is fixed to a surface of said molded reactive material opposite to the molded portion of said reactive material.

5. The method of claim 4, wherein said layer of reactive material is first placed on one face of said heat diffusing material prior to molding said reactive material.

6. The method of claim 5, wherein said layer of heat diffusing material is formed between opposing sides of two mold members.

* * * * *